(12) United States Patent
Caruel

(10) Patent No.: US 12,497,184 B2
(45) Date of Patent: Dec. 16, 2025

(54) AIR INTAKE MODULE FOR AN AIRCRAFT TURBOMACHINE AND METHOD FOR DE-ICING THEREOF

(71) Applicant: SAFRAN NACELLES, Gonfreville-l'Orcher (FR)

(72) Inventor: Pierre Charles Caruel, Moissy-Cramayel (FR)

(73) Assignee: SAFRAN NACELLES, Gonfreville-l'Orcher (FR)

( * ) Notice: Subject to any disclaimer, the term of this patent is extended or adjusted under 35 U.S.C. 154(b) by 0 days.

(21) Appl. No.: 18/734,449

(22) Filed: Jun. 5, 2024

(65) Prior Publication Data
US 2024/0425191 A1    Dec. 26, 2024

(30) Foreign Application Priority Data
Jun. 11, 2023   (FR) ...................................... 2305887

(51) Int. Cl.
*B64D 33/02*     (2006.01)
*B64D 15/20*     (2006.01)
(Continued)

(52) U.S. Cl.
CPC ............. *B64D 33/02* (2013.01); *B64D 15/20* (2013.01); *F01D 5/046* (2013.01); *F01D 5/08* (2013.01);
(Continued)

(58) Field of Classification Search
CPC ........ F02C 7/047; F01D 25/02; F01D 25/162; F01D 9/065; F01D 5/046; F01D 5/08; F01D 17/02; F01D 21/033; B64D 2033/0233; B64D 33/02; B64D 15/20; F05D 2240/122; F05D 2220/3217; F02K 3/06

See application file for complete search history.

(56) References Cited

U.S. PATENT DOCUMENTS 2,469,375 A * 5/1949 Flagle ..................... F02C 7/047
                                                      415/118
4,379,227 A * 4/1983 Kovacs .................. B64D 15/20
                                                      340/583
(Continued)

FOREIGN PATENT DOCUMENTS

FR       2986779 A1    8/2013
FR       3096657 B1    4/2021

OTHER PUBLICATIONS

French Search Report for FR2305887, filed Nov. 15, 2023, 2 pages.

*Primary Examiner* — Jason H Duger
(74) *Attorney, Agent, or Firm* — RANKIN, HILL & CLARK LLP

(57) ABSTRACT

An air intake module for an aircraft turbomachine extending along a longitudinal axis oriented from upstream to downstream and including an inner wall and an outer wall defining together a vein for circulating an air flow, a plurality of guide vanes of the air flow extending radially in the vein and each comprising an upstream leading edge, at least one stator member fixedly mounted on the inner wall and on the outer wall and extending radially in the vein upstream of the guide vanes, the stator member comprising an infrared wave emitting device configured to emit an infrared beam on the leading edge of at least one of the guide vanes for de-icing it.

15 Claims, 4 Drawing Sheets

(51) Int. Cl.
  *F01D 5/04*   (2006.01)
  *F01D 5/08*   (2006.01)
  *F01D 9/06*   (2006.01)
  *F01D 17/02*  (2006.01)
  *F01D 21/00*  (2006.01)
  *F01D 25/02*  (2006.01)
  *F01D 25/16*  (2006.01)
  *F02C 7/047*  (2006.01)
  *F02K 3/06*   (2006.01)

(52) U.S. Cl.
  CPC .............. *F01D 9/065* (2013.01); *F01D 17/02* (2013.01); *F01D 21/003* (2013.01); *F01D 25/02* (2013.01); *F01D 25/162* (2013.01); *F02C 7/047* (2013.01); *F02K 3/06* (2013.01); *B64D 2033/0233* (2013.01); *F05D 2220/3217* (2013.01); *F05D 2220/323* (2013.01); *F05D 2240/122* (2013.01)

(56) References Cited

U.S. PATENT DOCUMENTS

| | | | |
|---|---|---|---|
| 9,874,109 B2 | 1/2018 | Hatcher, Jr et al. | |
| 2017/0314464 A1* | 11/2017 | Wang | F02C 6/00 |
| 2017/0314465 A1* | 11/2017 | Beutin | F02C 7/185 |
| 2023/0193837 A1* | 6/2023 | Keeler | F23N 5/022 |
| | | | 60/39.281 |

* cited by examiner

AIR INTAKE MODULE FOR AN AIRCRAFT TURBOMACHINE AND METHOD FOR DE-ICING THEREOF

TECHNICAL FIELD

The present invention relates to the field of de-icing an air intake module of an aircraft turbomachine.

In a known manner, an aircraft turbomachine, such as a turboprop, comprises an air vein in which an air flow circulates from upstream to downstream. The turboprop conventionally comprises from upstream to downstream one or more compressors, a combustion chamber and one or more turbines. One of the turbines, notably the so-called power turbine, is rotationally coupled to a propeller mounted at the upstream end of the turboprop, conventionally via a reducer. The propeller makes it possible to ensure all or part of the thrust of the aircraft and is unshrouded, i.e. the turboprop is free of shroud extending around the rotating blades of the propeller.

In a known manner, the turboprop comprises a straightener comprising stator vanes that extend to the inlet of the air vein to guide the air exiting the propeller into the vein. The air taken in is compressed in the compressor(s) each having one or more stages with a rotor and stator. To adapt the air flow rate taken into the compressor as a function of the speed of the turboprop, an inlet guiding wheel is conventionally mounted between the straightener and the compressor(s). The inlet guiding wheel comprises variable pitch stator vanes, i.e. mounted radially pivoting to have a variable inclination angle.

In practice, when an aircraft is flying, due to temperature and pressure conditions, ice is likely to form or even accumulate on the vanes of the straightener, the inlet guiding wheel or even the rotor of the upstream stage of the compressor. The accumulation of ice is undesirable as it can affect the aerodynamism and mass distribution around the rotational axis of the turboprop. In addition, the detachment of a block of ice from the propeller may cause it to be ingested into the turboprop, which is capable of damaging it. Turboprops are more exposed to ice than turbojets, the blower of which is shrouded and makes it possible, by centrifugal effect, to direct the supercooled water into the secondary vein and thus prevent ice formation in the primary vein.

To prevent the formation and/or accumulation of ice in turbojets, it is known by patent applications FR2986779A1 and FR3096657A1 to mount an infrared device in the nacelle to heat the walls of the air inlet. Such a solution increases the bulk in the air inlet and the emitted infrared radiation is not adapted to reach the vanes located in the air vein of a turboprop, notably those of the inlet guiding wheel and the rotor of the upstream stage of the compressor.

The invention thus aims to eliminate at least some of these drawbacks.

SUMMARY

The invention relates to an air intake module for an aircraft turbomachine, said air intake module extending along a longitudinal axis oriented from upstream to downstream and being configured to be mounted downstream of a propeller of the aircraft turbomachine, said air intake module comprising:
- an inner wall and an outer wall, extending around the inner wall, together defining a vein for circulation of an air flow,
- a plurality of air flow guide vanes extending radially in the vein and each comprising an upstream leading edge, and
- at least one stator member fixedly mounted on the inner wall and on the outer wall and extending radially in the vein upstream of the guide vanes.

The invention is remarkable in that said at least one stator member comprises an infrared wave emitting device configured to emit an infrared beam on the leading edge of at least one of the guide vanes.

Thanks to the invention, the guide vanes located in the air vein can be de-iced efficiently and precisely thanks to a low-energy infrared beam emitted directly within the air vein. The infrared wave emitting device is advantageously integrated in the stator members present in the air vein, at the level of the downstream end, so as not to disturb the flowing of the air flow. This makes it possible to emit an infrared beam of direction and opening angle allowing a precise and efficient de-icing of the leading edge of the guide vanes.

According to one aspect of the invention, said stator member or at least one of the stator members is in the form of a structural casing arm. The arms of the structural casing, by virtue of their dimensions and their structural function in the turbomachine, are advantageously adapted to receive the infrared wave emitting device. Further, the arms of the structural casing extend directly upstream of the vanes of the inlet guiding wheel, which allows a localized de-icing, therefore precise and efficient, without risk of overheating.

According to one aspect of the invention, said stator member or at least one of the stator members is in the form of a straightener vane. The straightener vanes are advantageously distributed over the entire circumference of the air vein which makes it possible to integrate a large number of infrared wave emitting devices each directed towards the leading edge of a limited number of guide vanes.

According to one aspect of the invention, at least a part of the guide vanes are inlet guiding vanes, preferably mounted pivoting along a radial axis. The inlet guiding vanes are exposed to ice, in particular in a turboprop where the propeller is unshrouded. Indeed, supercooled water is not discharged by centrifugal effect into a secondary vein as is the case in a turbojet with a blower.

According to one aspect of the invention, at least a part of the guide vanes are compressor vanes, preferably rotor vanes of an upstream stage of the compressor. Such vanes are also subject to the risk of ice in particular in a turboprop where the propeller is unshrouded. Indeed, supercooled water is not discharged by centrifugal effect into a secondary vein as is the case in a turbojet with a blower.

According to one aspect of the invention, the infrared wave emitting device is configured to emit a directional infrared beam oriented downstream having an opening angle of less than 150°. The infrared beam is preferably oriented along an axis parallel to the longitudinal axis. This allows the infrared radiation to be directed only onto the areas to be de-iced, namely the leading edge of the guide vanes. This makes it possible to reduce energy consumption.

According to one aspect of the invention, the infrared wave emitting device comprises an infrared wave source and a reflecting member mounted upstream of the infrared wave source, the reflecting member being preferably mounted concave with the concavity facing downstream. Preferably, the reflecting member is a metal wall, preferentially polished. Advantageously, the reflecting member makes it possible to direct and concentrate the infrared beam onto the areas to be de-iced, namely the leading edge of the guide vanes.

According to one aspect of the invention, the infrared wave emitting device is configured to illuminate in an intermittent manner during the passage of the guide vanes in the area illuminated by the infrared beam. An intermittent illumination advantageously allows a reduction in energy consumption, while ensuring efficient de-icing.

According to one aspect of the invention, the infrared wave emitting device comprises an infrared wave source in the form of an electrically powered resistive heating member. Such an infrared wave source is advantageously efficient and economical.

According to one aspect of the invention, said at least one stator member comprises a downstream housing in which the infrared wave emitting device is mounted to protect it and not disturb the flowing of the air flow in the vein.

Preferably, the downstream housing comprises at least one translucent or transparent portion, which is advantageously adapted to transmit infrared radiation.

According to a preferred aspect, the downstream housing is open. This makes it possible to dispense with a translucent or transparent portion. The downstream housing may notably be formed by the body of the stator member in a simple and practical manner.

According to another preferred aspect, the downstream housing is closed and thus comprises a trailing edge making it possible to maintain aerodynamism.

The invention also relates to an assembly of a propeller for an aircraft turbomachine and an air intake module as described previously, wherein the air intake module is mounted downstream of the propeller.

The invention also relates to an aircraft turbomachine comprising a propeller and an air intake module as described previously, wherein the air intake module is mounted downstream of the propeller. The aircraft turbomachine is preferably in the form of a turboprop.

The invention also relates to a method for de-icing an air intake module as described previously, wherein the infrared wave emitting device of said at least one stator member emits an infrared beam on the leading edge of at least one of the guide vanes.

DESCRIPTION OF THE FIGURES

The invention will be better understood upon reading the following description, given as an example, and referring to the following figures, given as non-limiting examples, wherein identical references are given to similar objects.

Figure 1:
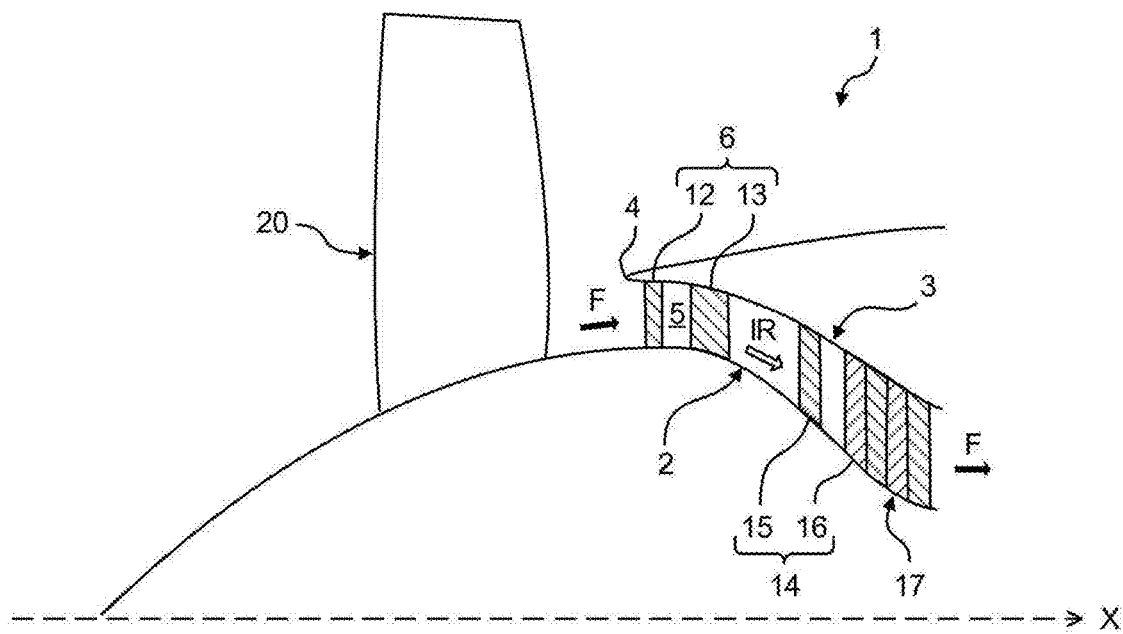
FIG. 1 is a longitudinal half-sectional schematic representation of an air intake module of an aircraft turboprop according to one embodiment of the invention.

It should be noted that the figures set out the invention in detail in order to implement the invention, said figures may of course be used to better define the invention where applicable.

DETAILED DESCRIPTION

The invention relates to an air intake module configured to be mounted in an aircraft turbomachine, in particular a turboprop, and the method for de-icing thereof.

As described previously and partially illustrated in FIG. 1, an aircraft turbomachine, in particular a turboprop, conventionally comprises an air vein 5 in which an air flow F circulates from upstream to downstream. The turboprop conventionally comprises from upstream to downstream one or more compressors 17, a combustion chamber (not shown) and one or more turbines (not shown). One of the turbines, notably the so-called power turbine, is coupled in rotation to a propeller 20 mounted at the upstream end of the turboprop, conventionally via a reducer (not shown). The propeller 20 makes it possible to ensure all or part of the thrust of the aircraft and is unshrouded, i.e. the turboprop is free of shroud extending around the rotating blades of the propeller 20.

As described previously and illustrated in FIG. 1, the aircraft turboprop comprises a straightener 12 comprising stator vanes extending to the inlet of the air vein 5 to guide the air flow F exiting the propeller 20 into the vein 5. The air flow F taken in is compressed in the compressor(s) 17 each comprising one or more stages with a rotor and a stator. To adapt the air flow rate taken into the compressor 17 as a function of the speed of the turboprop, the turboprop comprises an inlet guiding wheel 15 mounted downstream of the straightener 12 and upstream of the compressor(s) 17. The inlet guiding wheel 15 comprises stator vanes with variable pitch, i.e. mounted radially pivoting to have a variable inclination angle.

As illustrated in FIG. 1, the aircraft turboprop also comprises a structural casing 13 comprising one or more structural arms extending in the air vein downstream of the straightener 12 and upstream of the inlet guiding wheel 15. The arms of the structural casing 13 typically ensure the passage of the wiring and the lubricating fluid. It goes without saying that the turboprop could not comprise a straightener 12 or not comprise an inlet guiding wheel 15.

According to the invention and as illustrated in FIG. 1, the air intake module 1 is mounted downstream of the propeller 20 along a longitudinal axis X and comprises:
  an inner wall 2 and an outer wall 3, extending around the inner wall 2, together defining the air vein 5,
  guide vanes 14 of the air flow F extending radially in the vein 5 and each comprising an upstream leading edge BA (FIG. 2) exposed to icing,
  one or more stator members 6 fixedly mounted on the inner wall 2 and on the outer wall 3 and extending radially in the vein 5 upstream of the guide vanes 14, one or more of the stator members 6 comprising an infrared wave emitting device 8 (see FIG. 2) configured to emit an infrared IR beam on the leading edge BA of one or more of the guide vanes 14 for de-icing them.

It is specified that the terms "upstream" and "downstream" are defined with respect to the circulation of the air flow F. The terms "inner" and "outer" are for their part defined radially with respect to the X axis of the air intake module 1.

As will be described hereafter, the guide vanes 14 preferably designate the vanes of the inlet guiding wheel 15 and/or the vanes of the rotor 16 of the upstream stage of the compressor 17 extending downstream of the inlet guiding wheel 15. In addition, the stator member(s) 6 preferably designate one or more straightener vanes 12 and/or one or more arms of the structural casing 13.

The guide vanes 14 in the air vein 5, notably those of the inlet guiding wheel 15 and/or compressor 17 rotor 16, are thus de-iced thanks to one or more local infrared wave sources mounted directly in the air vein 5. The de-icing is advantageously efficient and not very energy consuming. The infrared wave sources are advantageously integrated in the arms of the structural casing 13 and/or in the straightener vanes 12 as close as possible to the guide vanes 14 to be de-iced.

As illustrated in FIG. 1, the air vein 5 is typically axisymmetric, delimited radially internally by the inner wall 2 and radially externally by the outer wall 3. The outer wall 3 comprises at its upstream end an air inlet lip 4 and is defined from upstream to downstream by the outer shell of the straightener 12, by the outer wall of the structural casing 13, by the outer shell of the input guiding wheel 15 and by the outer wall of the rotor 16 of the upstream stage of the compressor 17. The inner wall 2 extends downstream of the propellor 20 and more precisely in the downstream extension of the cone wall of the propellor 20. The inner wall 2 is defined from upstream to downstream by the inner shell of the straightener 12, by the inner wall of the structural casing 13, by the disk of the inlet guiding wheel 15 and by the rotor disk 16 of the upstream stage of the compressor 17.

Figure 2:
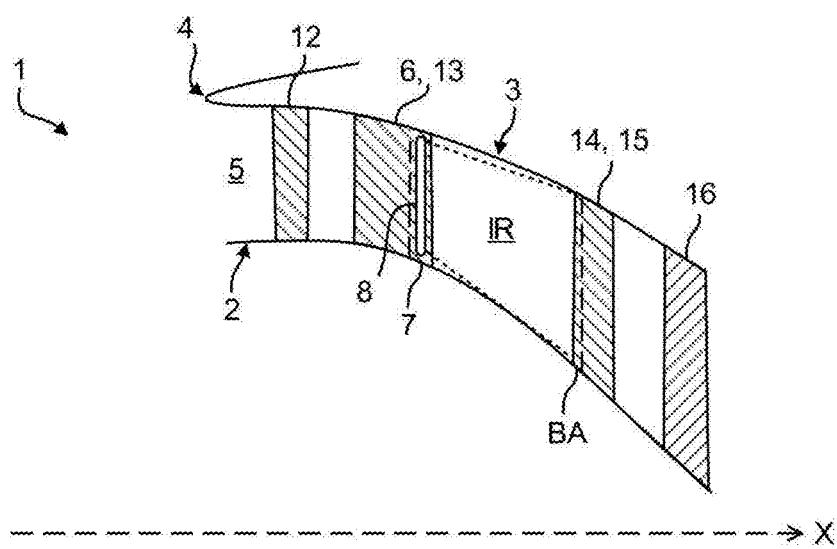
FIG. 2 is a close-up schematic representation of FIG. 1, wherein an infrared wave emitting device is integrated in one or more casing structural arms for de-icing the leading edge of the vanes of the input guiding wheel.
Figure 3:
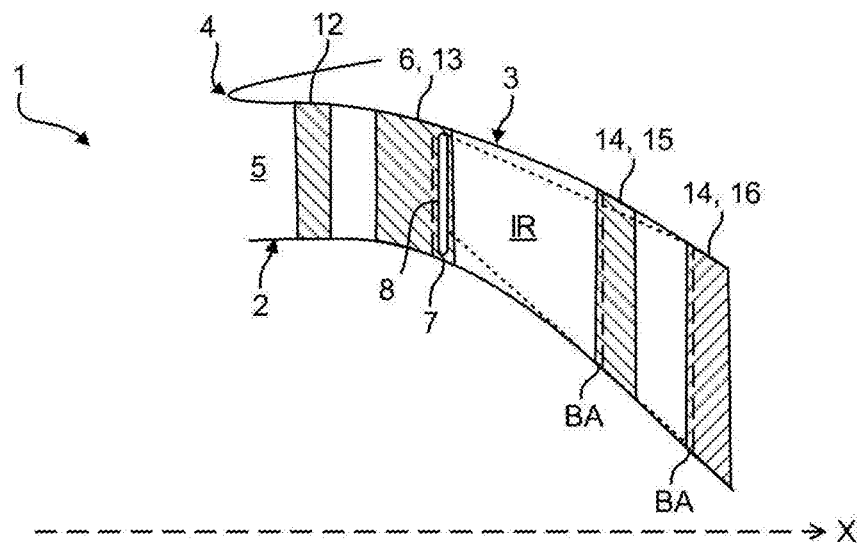
FIG. 3 is a schematic representation of an alternative embodiment of FIG. 2, wherein the infrared wave emitting devices also ensure the de-icing of the leading edge of the rotor vanes of the upstream stage of the compressor.

In the example of FIG. 2, the infrared wave emitting device 8 is integrated in one or more structural casing arms 13 at the level of their downstream end so as to emit an infrared IR beam on the leading edge BA of one or more vanes of the inlet guiding wheel 15. As illustrated in FIG. 3, the infrared IR beam may alternatively or complementarily be directed onto the leading edge BA of one or more vanes of the compressor 17, and notably those of the rotor 16 of the upstream stage that are the most exposed to ice. These embodiments, where the arms of the structural casing 13 form the stator members 6, are particularly advantageous because the infrared source is thus located as close as possible to the guide vanes 14 to be de-iced. Further, the arms of the structural casing arms 13 are adapted in terms of dimensions to integrate an infrared wave emitting device 8.

Figure 4:
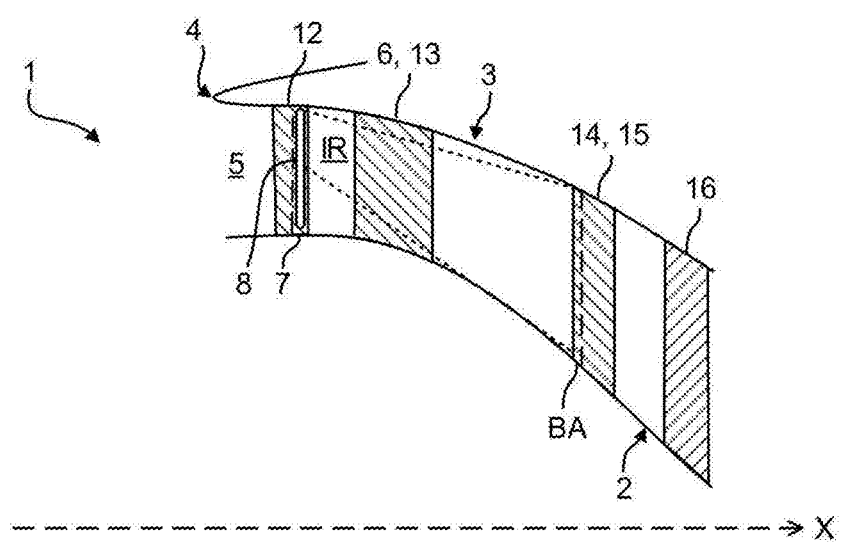
FIG. 4 is a schematic representation of an alternative embodiment of FIG. 2, wherein an infrared wave emitting device is integrated in one or more straightener vanes to de-ice the leading edge of the inlet guide vanes.
Figure 5:
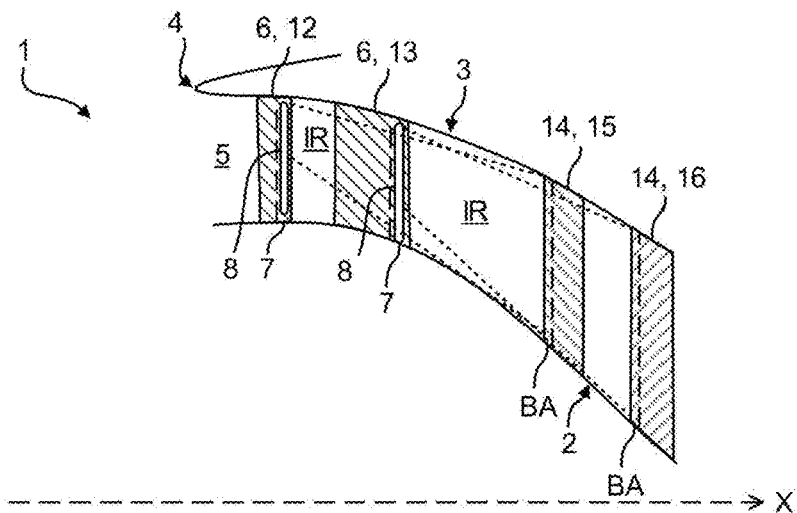
FIG. 5 is a schematic representation of an alternative embodiment of FIG. 2, wherein infrared wave emitting devices are integrated in casing structural arms and straightener vanes to de-ice the leading edge of the inlet guiding vanes and the rotor vanes of the upstream stage of the compressor.

In the example of FIG. 4, the infrared wave emitting device 8 is integrated in one or more vanes of the straightener 12 at the level of their downstream end so as to emit an infrared IR beam on the leading edge BA of one or more vanes of the inlet guiding wheel 15. Alternatively or complementarily, the infrared IR beam is directed onto the leading edge BA of one or more vanes of the compressor 17, and notably those of the rotor 16 of the upstream stage the most exposed to ice. These embodiments, where the straightener vanes 12 form the stator members 6, have the advantage of having a greater number of infrared sources distributed over the circumference of the air vein 5. As illustrated in FIG. 5, infrared wave emitting devices 8 may be integrated both in the straightener vanes 12 and in the arms of the structural casing 13.

Figure 7:
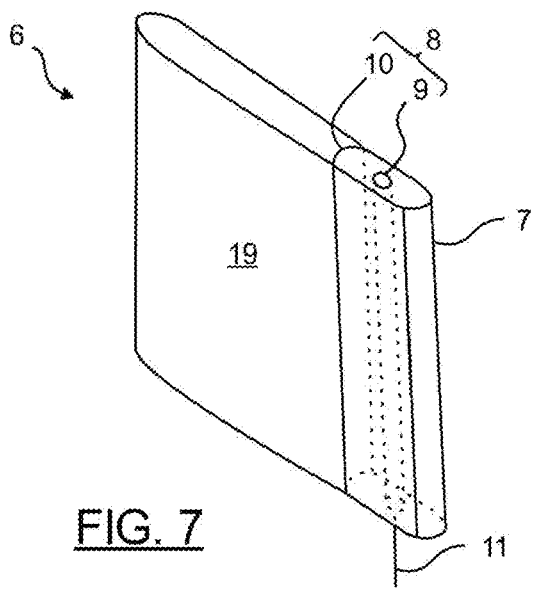
FIG. 7 is a schematic perspective representation of a stator member according to a first embodiment of the invention.
Figure 8:
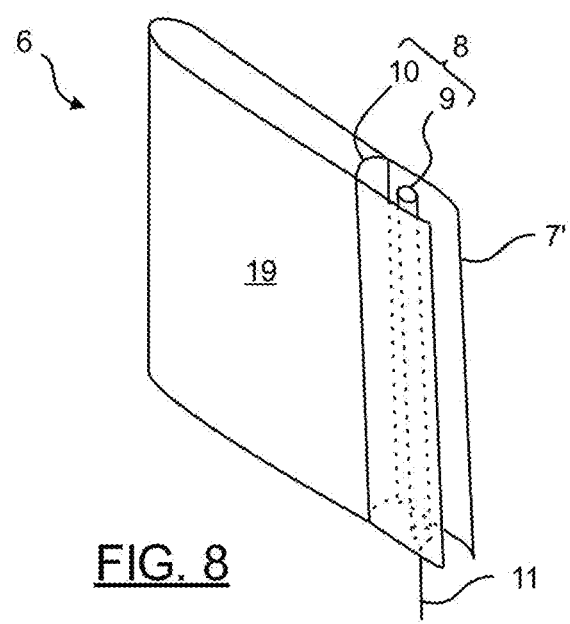
FIG. 8 is a schematic perspective representation of a stator member according to second embodiment of the invention.

In the example of FIGS. 7 and 8, the infrared wave emitting device 8 is mounted in a downstream housing 7, 7' of the stator member 6, whether it is a structural casing arm 13 or a straightener vane 12. For this purpose, the stator member 6 comprises a body 19 with a truncated downstream end and the downstream housing 7, 7' extends downstream of the body 19 (in the place of the truncated downstream end). Alternatively, the body 19 of the stator member 6 comprises a downstream end and the downstream housing 7, 7' extends downstream of the downstream end of the body 19. The downstream housing 7, 7' may also be formed in whole or in part by the body 19 of the stator member 6 itself.

As illustrated in FIGS. 7 and 8, the downstream housing 7, 7' preferably extends into the downstream extension of the stator member 6 to maintain aerodynamism. In the example of FIG. 7, the downstream housing 7 is closed and comprises an aerodynamic trailing edge. Such a housing 7 comprises at least one translucent or transparent portion adapted to transmit at least partially the infrared IR beam emitted by the infrared wave emitting device 8. In the example of FIG. 8, the downstream housing 7' is open downstream, namely is free of trailing edge. The opening makes it possible to dispense with translucent or transparent material to transmit the infrared IR beam.

As illustrated in FIGS. 7 and 8, the infrared wave emitting device 8 comprises an infrared wave source 9 and, preferably, a reflective member 10 mounted upstream of the infrared wave source 9. The infrared wave source 9 is preferably in the form of an electrically supplied resistive heating member, notably emitting an omnidirectional radiation. The infrared wave source 9 preferably extends over at least half of the radial height of the stator member 6, preferentially over at least 75%, and even more preferably over substantially the entire radial height. In this example, the infrared wave source 9 is in the form of a filament, notably of carbon, I-shaped comprising power supply connectors 11 at its radially inner and outer ends. Alternatively, a U-shape with two power supply connectors 11 on the same radially inner or outer side may be used.

Figure 6:
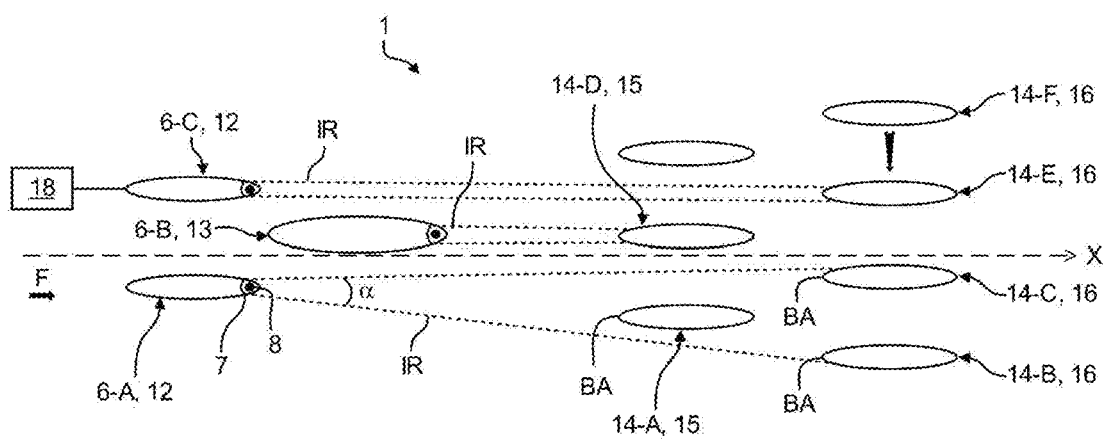
FIG. 6 is a schematic projection representation of the stator members and the guide vanes of the air intake module according to one embodiment of the invention.

As illustrated in FIG. 6, the infrared wave emitting device 8 is configured to emit a directional infrared IR beam oriented downstream, notably along an axis substantially parallel to the longitudinal axis X, having a predetermined opening angle α. The reflecting member 10, preferably concave with the concavity facing downstream, advantageously makes it possible to reflect the omnidirectional radiation emitted by the infrared wave source 9 so as to form the infrared IR beam. The reflecting member 10 is for example a metal wall, in particular polished. Alternatively or in a complementary manner, the dimensioning of the opening and/or the translucent or transparent portion of the housing 7, 7' makes it possible to form the infrared IR beam.

The opening angle α is preferably less than 150°, defined in a tangential plane with respect to the longitudinal axis X. A small opening angle α, for example less than 90°, makes it possible to concentrate the irradiation on the leading edge BA of a single guide member 14-D, in the example of FIG. 6 from the stator member 6-B. A large opening angle α, for example between 90° and 150°, makes it possible to encompass the leading edge BA of several neighboring guide members 14, of the same type or not. In this example, the infrared wave emitting device 8 integrated in the stator member 6-A makes it possible to irradiate several vanes of the compressor 17, but also a vane of the inlet guiding wheel 15. The infrared IR beam is continuous or intermittent, depending on the de-icing needs.

According to one aspect illustrated in FIG. 6, the infrared wave emitting device 8 mounted in the stator member 6-C is configured to emit an intermittent infrared IR beam only during the passage of a rotor vane 16 of the compressor 17 in the area illuminated by the infrared IR beam. This makes it possible to synchronize the infrared illumination with the passage of the vane. The infrared wave emitting device 8 is only switched on during the passage of the rotor vane 16 in its illumination area, which reduces the energy consumption. The illumination frequency is determined, for example, from the rotational speed of the rotor 16, notably acquired by a measuring member 18 such as an optical, Hall effect, capacitive or inductive sensor.

The invention also relates to a method for de-icing the air intake module 1 in which each infrared wave emitting device 8 emits an infrared IR beam on one or more guide vanes 14 in the air vein 5. The de-icing may be triggered manually or automatically, continuously or intermittently. The infrared IR beam received on the leading edge BA of the guide vane 14 advantageously makes it possible to melt the ice present or prevent its formation. The invention has the advantage of being low-energy and precise, thanks to infrared wave sources 9 mounted directly in the air vein 5 as close as possible to the guide vanes 14 to be de-iced.

The invention claimed is:

1. An air intake module for an aircraft turbomachine, said air intake module extending along a longitudinal axis oriented from upstream to downstream and being configured to be mounted downstream of a propeller of the aircraft turbomachine, said air intake module comprising:
    an inner wall and an outer wall, the outer wall extending around the inner wall, the inner wall and the outer wall cooperating to define a vein for circulating an air flow,
    a plurality of guide vanes of the air flow extending radially in the vein and each comprising an upstream leading edge,
    at least one stator member fixedly mounted on the inner wall and on the outer wall and extending radially in the vein upstream of the guide vanes,
    wherein said at least one stator member comprises an infrared wave emitting device integrated therein, the infrared wave emitting device extending radially in the vein upstream of the guide vanes so as to emit an infrared beam on the leading edge of at least one of the guide vanes.

2. The air intake module according to claim 1, wherein said at least one stator member is a structural casing arm.

3. The air intake module according to claim 1, wherein said at least one stator member is a vane of a straightener.

4. The air intake module according to claim 1, wherein at least a part of the guide vanes are vanes of an inlet guiding wheel.

5. The air intake module according to claim 1, wherein at least a part of the guide vanes are vanes of a compressor.

6. The air intake module according to claim 1, wherein the infrared wave emitting device is configured to emit the infrared beam along a direction oriented downstream having an opening angle less than 150°.

7. The air intake module according to claim 1, wherein the infrared wave emitting device comprises an infrared wave source and a reflecting member, the reflecting member being mounted upstream of the infrared wave source.

8. The air intake module according to claim 1, wherein the infrared wave emitting device is configured to illuminate in an intermittent manner during a passage of the guide vanes in an area illuminated by the infrared beam.

9. The air intake module according to claim 1, wherein said at least one stator member comprises a downstream housing in which the infrared wave emitting device is mounted.

10. The air intake module according to claim 1, wherein at least a part of the guide vanes are vanes of an inlet guiding wheel that are mounted pivoting along a radial axis.

11. The air intake module according to claim 1, wherein at least a part of the guide vanes are rotor vanes of an upstream stage of a compressor.

12. The air intake module according to claim 1, wherein the infrared wave emitting device comprises an infrared wave source and a reflecting member, the reflecting member being mounted upstream of the infrared wave source and concave with the concavity facing downstream.

13. The air intake module according to claim 1, wherein said at least one stator member comprises a downstream housing in which the infrared wave emitting device is mounted, the downstream housing comprising at least one translucent portion.

14. The air intake module according to claim 1, wherein said at least one stator member comprises a downstream housing in which the infrared wave emitting device is mounted, the downstream housing comprising at least one transparent portion.

15. A method for de-icing an air intake module of an aircraft turbomachine, the method comprising the steps of:
    providing the air intake module extending along a longitudinal axis oriented from upstream to downstream and being configured to be mounted downstream of a propeller of the aircraft turbomachine, the air intake module including an inner wall and an outer wall, the outer wall extending around the inner wall, the inner wall and the outer wall cooperating to define a vein for circulating an air flow, a plurality of guide vanes of the air flow extending radially in the vein and each comprising an upstream leading edge, at least one stator member fixedly mounted on the inner wall and on the outer wall and extending radially in the vein upstream of the guide vanes, said at least one stator member including an infrared wave emitting device integrated therein, the infrared wave emitting device extending radially in the vein upstream of the guide vanes; and
    emitting an infrared beam with the infrared wave emitting device onto the leading edge of at least one of the guide vanes.

* * * * *